United States Patent
Hough et al.

(10) Patent No.: US 11,117,328 B2
(45) Date of Patent: Sep. 14, 2021

(54) SYSTEMS, METHODS, AND MEDIA FOR MANUFACTURING PROCESSES

(71) Applicant: Nanotronics Imaging, Inc., Cuyahoga Falls, OH (US)

(72) Inventors: Fabian Hough, Brooklyn, NY (US); John B. Putman, Celebration, FL (US); Matthew C. Putman, Brooklyn, NY (US); Vadim Pinskiy, Wayne, NJ (US); Damas Limoge, Brooklyn, NY (US); Aswin Raghav Nirmaleswaran, Brooklyn, NY (US); Sadegh Nouri Gooshki, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

(21) Appl. No.: 17/015,674

(22) Filed: Sep. 9, 2020

(65) Prior Publication Data

US 2021/0069990 A1 Mar. 11, 2021

Related U.S. Application Data

(60) Provisional application No. 62/898,535, filed on Sep. 10, 2019.

(51) Int. Cl.
*B29C 64/393* (2017.01)
*B33Y 30/00* (2015.01)
(Continued)

(52) U.S. Cl.
CPC ............ *B29C 64/393* (2017.08); *B33Y 10/00* (2014.12); *B33Y 30/00* (2014.12); *B33Y 50/02* (2014.12);
(Continued)

(58) Field of Classification Search
CPC .... B29C 64/393; G05B 19/4099; G06N 3/08; B33Y 10/00; B33Y 50/02; B33Y 30/00
See application file for complete search history.

(56) References Cited

U.S. PATENT DOCUMENTS

| | | |
|---|---|---|
| 4,433,385 A | 2/1984 | De Gasperi et al. |
| 5,027,295 A | 6/1991 | Yotsuya |
| (Continued) | | |

FOREIGN PATENT DOCUMENTS

| | | |
|---|---|---|
| AU | 2002359881 | 7/2003 |
| EP | 2585248 | 6/2011 |
| (Continued) | | |

OTHER PUBLICATIONS

Limoge, et al., "Inferential Methods for Additive Manufacturing Feedback", 2020 American Control Conference (ACC), IEEE, 2020, 8 pages.

(Continued)

*Primary Examiner* — Michael M. Robinson
(74) *Attorney, Agent, or Firm* — DLA Piper LLP (US)

(57) ABSTRACT

A manufacturing system is disclosed herein. The manufacturing system includes one or more stations, a monitoring platform, and a control module. Each station of the one or more stations is configured to perform at least one step in a multi-step manufacturing process for a product. The monitoring platform is configured to monitor progression of the product throughout the multi-step manufacturing process. The control module is configured to dynamically adjust processing parameters of each step of the multi-step manufacturing process to achieve a desired final quality metric for the product.

20 Claims, 6 Drawing Sheets

100

(51) Int. Cl.
  *B33Y 50/02* (2015.01)
  *G05B 19/4099* (2006.01)
  *G06N 3/08* (2006.01)
  *B33Y 10/00* (2015.01)

(52) U.S. Cl.
  CPC ........... *G05B 19/4099* (2013.01); *G06N 3/08* (2013.01); *G05B 2219/49023* (2013.01)

(56) References Cited

U.S. PATENT DOCUMENTS

| | | | |
|---|---|---|---|
| 5,815,198 | A | 9/1998 | Vachtsevanos et al. |
| 6,266,436 | B1 | 7/2001 | Bett et al. |
| 8,185,217 | B2 | 5/2012 | Thiele |
| 8,612,043 | B2 | 12/2013 | Moyne et al. |
| 8,909,926 | B2 | 12/2014 | Brandt et al. |
| 9,945,264 | B2 | 4/2018 | Wichmann et al. |
| 10,481,579 | B1 | 11/2019 | Putman et al. |
| 2003/0061004 | A1 | 3/2003 | Discenzo |
| 2004/0070509 | A1 | 4/2004 | Grace et al. |
| 2007/0177787 | A1 | 8/2007 | Maeda et al. |
| 2009/0198464 | A1 | 8/2009 | Clarke et al. |
| 2014/0247347 | A1 | 9/2014 | McNeill et al. |
| 2014/0301179 | A1 | 10/2014 | Rich et al. |
| 2015/0009301 | A1 | 1/2015 | Ribnick et al. |
| 2016/0236414 | A1 | 8/2016 | Reese et al. |
| 2017/0102694 | A1 | 4/2017 | Enver et al. |
| 2018/0079125 | A1 | 3/2018 | Perez et al. |
| 2018/0358271 | A1 | 12/2018 | David |
| 2018/0376067 | A1 | 12/2018 | Martineau |
| 2019/0004079 | A1* | 1/2019 | Blom ............... B22F 10/00 |
| 2019/0094842 | A1 | 3/2019 | Lee et al. |
| 2019/0094843 | A1 | 3/2019 | Lee et al. |
| 2019/0105801 | A1* | 4/2019 | Martinez ........... B28C 7/026 |
| 2019/0118300 | A1 | 4/2019 | Penny et al. |
| 2019/0295906 | A1 | 9/2019 | Clark et al. |
| 2020/0111689 | A1 | 4/2020 | Banna et al. |
| 2020/0247063 | A1 | 8/2020 | Pinskiy et al. |

FOREIGN PATENT DOCUMENTS

| | | |
|---|---|---|
| TW | 201610629 | 3/2016 |
| WO | 2019/195095 | 10/2019 |

OTHER PUBLICATIONS

Krizhevsky, et al., "Imagenet classification with deep convolutional neural networks", Advances in neural information processing systems, 2012, 9 pages.
Lawrence, et al., "Face recognition: a convolutional neural-network approach", IEEE transactions on neural networks vol. 8, No. 1, Jan. 1997, pp. 98-113.
Kalchbrenner, et al., "A convolutional neural network for modelling sentences", arXiv preprint arXiv:1404.2188, Apr. 8, 2014, 11 pages.
SPC for Excel, "Interpreting Control Charts", BPI Consulting, https://www.spcforexcel.com/knowledge/control-charts-basics/interpreting-control-charts, Apr. 2004, 9 pages.
Salakhutdinov, et al., "Semantic hashing", International Journal of Approximate Reasoning 50.7, 2009, pp. 969-978.
Hinton, et al., "Reducing the dimensionality of data with neural networks", Science, vol. 313, 5014, Jul. 28, 2006, pp. 504-507.
Sutton, et al., "Reinforcement learning: an introduction", MIT press, 2018.
Mnih, et al., "Playing atari with deep reinforcement learning", arXiv preprint arXiv:1312.5602, Dec. 19, 2013, 9 pages.
Silver, et al., "Mastering the game of Go with deep neural networks and tree search", Nature, vol. 529, 7587, Jan. 28, 2016, pp. 484-489.
OpenAI, "OpenAI Five", https://openai.com/blog/openai-five/, Jun. 25, 2018, 17 pages.
Ng, "Sparse autoencoder", CS294A Lecture notes 72.2011, 2011, 19 pages.
Whitney, et al., "Dynamics-aware Embeddings", arXiv preprint arXiv:1908.09357, ICLR 2020, Jan. 14, 2020, 17 pages.
Vecerik, et al., "Leveraging demonstrations for deep reinforcement learning on robotics problems with sparse rewards", arXiv preprint arXiv:1707.08817, Oct. 8, 2018, 10 pages.
SPC for Excel, "Control Chart Rules and Interpretation", BPI Consulting, https://www.spcforexcel.com/knowledge/control-chart-basics/control-chart-rules-interpretation, Mar. 2016, 20 pages.
Lillicrap, et al., "Continuous control with deep reinforcement learning", arXiv preprint arXiv:1509.02971, ICLR 2016, Jul. 5, 2019, 14 pages.
Schaul, et al., "Prioritized experience replay", arXiv preprint arXiv:1511.05952, ICLR 2016, Feb. 25, 2016, 21 pages.
Hou, et al., "A novel DDPG method with prioritized experience replay", 2017 IEEE International Conference on Systems, Man, and Cybernetics (SMC), Oct. 2017, pp. 316-321.
Tavakoli, et al., "Action branching architectures for deep reinforcement learning", arXiv preprint arXiv:1711.08946, Jan. 25, 2019, 9 pages.
Mnih, et al., "Asynchronous methods for deep reinforcement learning", International conference on machine learning. 2016, 10 pages.
No Author, "Adaptive Methods and Real-Time Decision Making for Planning and Control of Manufacturing Processes", printed Sep. 9, 2020, 8 pages.
Albus, "A new approach to manipulator control: the cerebellar model articulation controller (CMAC)", Journal of Dynamic Systems, Measurement, and Control, Sep. 1975, pp. 220-227.
Ang, et al., "PID Control System Analysis, Design, and Technology", IEEE Transactions on Control Systems Technology, vol. 13, No. 4, Jul. 2005, pp. 559-576.
Bersimis, et al., "Multivariate statistical process control charts: an overview", Quality and Reliability engineering international 23.5, Nov. 7, 2006, pp. 517-543.
Bishop, "Pattern recognition and machine learning", Springer, 2006.
Koch, et al., "Reinforcement learning for UAV attitude control", ACM Transactions on Cyber-Physical Systems vol. 3, No. 2, Feb. 2019, 21 pages.
Limoge, et al., "An adaptive observer design for real-time parameter estimation in lithium-ion batteries", IEEE Transactions on Control Systems Technology, vol. 28, No. 2, Mar. 2018, pp. 505-520.
ASQ, "What is Statistical Process Control?", https://asq.org/quality-resources/statistical-process-control, Printed Jul. 23, 2019, 7 pages.
Oakland, "Statistical process control", Butterworth-Heinemann, 1986.
Slotine, et al., "Applied nonlinear control", vol. 199. No. 1. Englewood Cliffs, NJ: Prentice hall, 1991.
Woodall, "Controversies and contradictions in statistical process control", Journal of Quality Technology 32.4, Oct. 2000, pp. 341-350.
Woodall, et al., "Research issues and ideas in statistical process control", Journal of Quality Technology 31.4, Oct. 1999, pp. 376-386.
Limoge, Damas W., et al. "Inferential Methods for Additive Manufacturing Feedback." Printed Sep. 9, 2020.
Saunders, et al., "Visual feedback control of hand movements", Journal of Neuroscience 24.13, Mar. 2004, pp. 3223-3234.
Zhong, et al., "Intelligent manufacturing in the context of industry 4.0: a review", Engineering 3.5, Mar. 2017, pp. 616-630.
Szkilnyk, "Vision based fault detection in assembly automation", Queen's University, Jun. 2012, 219 pages.
Lardinois, "Nvidia's researchers teach a robot to perform simple tasks by observing a human", https://techcrunch.com/2018/05/20/nvidias-researchers-teach-a-robot-to-learn-simple-tasks-by-observing-a-human/, May 20, 2018, 6 pages.
Putman, et al., "Predictive Process Control for a Manufacturing Process", U.S. Appl. No. 16/519,102, filed Jul. 23, 2019, application as filed, 54 pages.
Malhotra, et al., "LSTM-based encoder-decoder for multi-sensor anomaly detection", arXiv preprint arXiv:1607.00148, Jul. 11, 2016, 5 pages.
An, et al., "Variational autoencoder based anomaly detection using reconstruction probability", Special Lecture on IE 2.1, Dec. 27, 2015, 18 pages.

(56) References Cited

OTHER PUBLICATIONS

Liu, et al., "Intelligent tuning method of PID parameters based on iterative learning control for atomic force microscopy", Science Direct Micron 104, 2018, pp. 26-36.
Sakurada, et al., "Anomaly detection using autoencoders with nonlinear dimensionality reduction", Proceedings of the MLSDA 2014 2nd Workshop on Machine Learning for Sensory Data Analysis, 2014, 8 pages.
Purdue University, "Intrusion Alert: System uses machine learning, curiosity-driven 'honeypots' to stop cyber attachers", Research Foundation News, Feb. 6, 2020, 6 pages.
Karnouskos, "Stuxnet worm impact on industrial cyber-physical system security", IECON 2011—37th Annual Conference of the IEEE Industrial Electronics Society, 2011, 5 pages.
Zhou, et al., "Anomaly detection with robust deep autoencoders", Proceedings of the 23rd ACM SIGKDD International Conference on Knowledge Discovery and Data Mining, Aug. 2017, pp. 665-674.
PCT International Application No. PCT/US20/49886; International Search Report and Written Opinion of the International Searching Authority; dated Dec. 8, 2020, 8 pages.

\* cited by examiner

SYSTEMS, METHODS, AND MEDIA FOR MANUFACTURING PROCESSES

CROSS-REFERENCE TO RELATED APPLICATIONS

This application claims priority to U.S. Provisional Application Ser. No. 62/898,535, filed Sep. 10, 2019, which is hereby incorporated by reference in its entirety.

FIELD OF DISCLOSURE

The present disclosure generally relates to a system, method, and media for manufacturing processes.

BACKGROUND

To manufacture products that consistently meet desired design specifications safely, timely, and with minimum waste, constant monitoring and adjustment to the manufacturing process is typically required.

SUMMARY

In some embodiments, a manufacturing system is disclosed herein. The manufacturing system includes one or more processing stations, a monitoring platform, and a control module. Each processing station of the one or more processing stations configured to perform at least one step in a multi-step manufacturing process for a product. The monitoring platform is configured to monitor progression of the product throughout the multi-step manufacturing process. The control module is configured to dynamically adjust processing parameters of each step of the multi-step manufacturing process to achieve a desired final quality metric for the product. The control module configured to perform operations. The operations include receiving, from the monitoring platform, an input associated with the product at a step of the multi-step manufacturing process. The operations further include generating, by the control module, a state encoding for the product based on the input. The operations further include determining, by the control module, based on the state encoding and the input that the final quality metric is not within a range of acceptable values. The operations further include, adjusting by the control module, control logic for at least a following processing station, based on the determining. The adjusting includes a corrective action to be performed by the following process station.

In some embodiments, a multi-step manufacturing method is disclosed herein. A computing system receives, from a monitoring platform of a manufacturing system, an image of a product at a processing station. The processing station may be configured to perform at least a step of the multi-step manufacturing process. The computing system generates a state encoding for the product based on the image of the product. The computing system determines, based on the state encoding and the image of the product, that a final quality metric of the product is not within a range of acceptable values. Based on the determining, the computing system adjusts control logic for at least a following processing station, wherein the adjusting comprising a corrective action to be performed by the following process station.

In some embodiments, a three-dimensional (3D) printing system is disclosed here. The 3D printing system includes a processing station, a monitoring platform, and a control module. The processing station is configured to deposit a plurality of layers to form a product. The monitoring platform configured to monitor progression of the product throughout a deposition process. The control module is configured to dynamically adjust processing parameters for each layer of the plurality of layers to achieve a desired final quality metric for the product. The control module configured to perform operations. The operations include receiving, from the monitoring platform, an image of the product after a layer has been deposited. The operations further include generating, by the control module, a state encoding for the product based on the image of the product. The operations further include determining, by the control module, based on the state encoding and the image of the product that the final quality metric is not within a range of acceptable values. The operations further include based on the determining, adjusting, by the control module, control logic for depositing at least a following layer of the plurality of layers. The adjusting includes a corrective action to be performed during deposition of the following layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Manufacturing processes may be complex and include raw materials being processed by different process stations (or "stations") until a final product is produced. In some embodiments, each process station receives an input for processing and may output an intermediate output that may be passed along to a subsequent (downstream) process station for additional processing. In some embodiments, a final process station may receive an input for processing and may output the final product or, more generally, the final output.

In some embodiments, each station may include one or more tools/equipment that may perform a set of processes steps. Exemplary process stations may include, but are not limited to, conveyor belts, injection molding presses, cutting machines, die stamping machines, extruders, computer numerical control (CNC) mills, grinders, assembly stations, three-dimensional printers, quality control stations, validation stations, and the like.

In some embodiments, operations of each process station may be governed by one or more process controllers. In some embodiments, each process station may include one or more process controllers that may be programmed to control the operation of the process station. In some embodiments, an operator, or control algorithms, may provide the station controller with station controller setpoints that may represent the desired value, or range of values, for each control value. In some embodiments, values used for feedback or feed forward in a manufacturing process may be referred to as control values. Exemplary control values may include, but are not limited to: speed, temperature, pressure, vacuum, rotation, current, voltage, power, viscosity, materials/resources used at the station, throughput rate, outage time, noxious fumes, and the like.

One or more techniques described herein are generally directed to a monitoring platform configured to monitor each step of a multi-step manufacturing process. For each step of the multi-step manufacturing process, the monitoring platform may monitor progress of the product and determine how a current state of the product affects a final quality metric associated with the final product. Generally, a final quality metric is a metric that cannot be measured at each step of a multi-step manufacturing process. Exemplary final quality metrics may include, but are not limited to, tensile strength, hardness, thermal properties of the final product, and the like. For certain final quality metrics, such as tensile strength, destructive testing is used for measuring such metric.

The one or more techniques described herein are able to project the final quality metric at each step of a multi-step manufacturing process using one or more artificial intelligence techniques. For example, the one or more techniques described herein may leverage one or more reinforcement algorithms to project the final quality metric based on a state of the product at a specific step of a multi-step manufacturing process.

The application of reinforcement learning to the physical environment is not a trivial task. Reinforcement learning, in general, is not as conducive to real, physical environments, as other types of machine learning techniques. This may be attributed to the large number of training examples that are typically required to train a prediction model. In the physical environment, it is often difficult to generate the requisite number of training examples due to the cost and time of manufacturing physical products. To account for this limitation, the one or more techniques provided herein may leverage a model-free reinforcement learning technique, which allows a prediction model to learn an environment as it is traversed. This plays well with physical measurements as it requires less measurements for a prediction of optimal actions.

Figure 1:
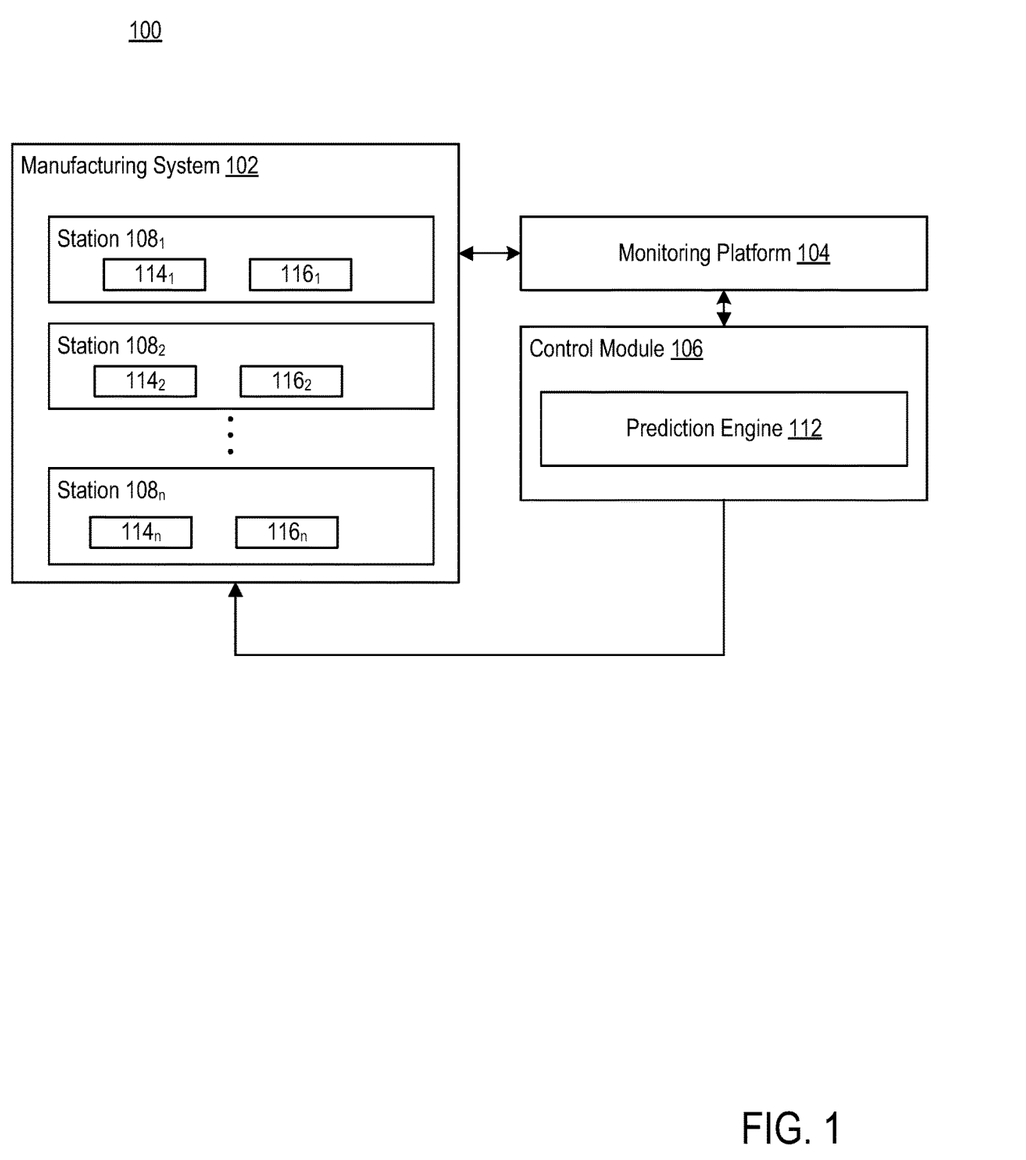
FIG. 1 is a block diagram illustrating a manufacturing environment, according to example embodiments.

FIG. 1 is a block diagram illustrating a manufacturing environment 100, according to example embodiments. Manufacturing environment 100 may include a manufacturing system 102, a monitoring platform 104, and a control module 106. Manufacturing system 102 may be broadly representative of a multi-step manufacturing system. In some embodiments, manufacturing system 102 may be representative of a manufacturing system for use in additive manufacturing (e.g., 3D printing system). In some embodiments, manufacturing system 102 may be representative of a manufacturing system for use in subtractive manufacturing (e.g., CNC machining. In some embodiments, manufacturing system 102 may be representative of a manufacturing system for use in a combination of additive manufacturing and subtractive manufacturing. More generally, in some embodiments, manufacturing system 102 may be representative of a manufacturing system for use in a general manufacturing process.

Manufacturing system 102 may include one or more stations $108_1$-$108_n$ (generally, "station 108"). Each station 108 may be representative of a step and/or station in a multi-step manufacturing process. For example, each station 108 may be representative of a layer deposition operation in a 3D printing process (e.g., station $108_1$ may correspond to layer 1, station $108_2$ may correspond to layer 2, etc.). In another example, each station 108 may correspond to a specific processing station.

Each station 108 may include a process controller 114 and control logic 116. Each process controller $114_1$-$114_n$ may be programmed to control the operation of each respective station 108. In some embodiments, control module 106 may provide each process controller 114 with station controller setpoints that may represent the desired value, or range of values, for each control value. Control logic 116 may refer to the attributes/parameters associated with a station's 108 process steps. In operation, control logic 116 for each station 108 may be dynamically updated throughout the manufacturing process by control module 106, depending on a current trajectory of a final quality metric.

Monitoring platform 104 may be configured to monitor each station 108 of manufacturing system 102. In some embodiments, monitoring platform 104 may be a component of manufacturing system 102. For example, monitoring platform 104 may be a component of a 3D printing system. In some embodiments, monitoring platform 104 may be independent of manufacturing system 102. For example, monitoring platform 104 may be retrofit onto an existing manufacturing system 102. In some embodiments, monitoring platform 104 may be representative of an imaging device configured to capture an image of a product at each step of a multi-step process. For example, monitoring platform 104 may be configured to capture an image of the product at each station 108. Generally, monitoring platform 104 may be configured to capture information associated with production of a product (e.g., an image, a voltage reading, a speed reading, etc.), and provide that information, as input, to control module 106 for evaluation.

Control module 106 may be in communication with manufacturing system 102 and monitoring platform 104 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN.

Control module 106 may be configured to control each process controller of manufacturing system 102. For example, based on information captured by monitoring platform 104, control module 106 may be configured to adjust process controls associated with a specific station 108. In some embodiments, control module 106 may be configured to adjust process controls of a specific station 108 based on a projected final quality metric.

Control module 106 may include prediction engine 112. Prediction engine 112 may be representative of one or more machine learning modules trained to project a final quality metric of a product based on measured data each individual step of a multi-step manufacturing process. In operation, control module 106 may receive input from monitoring platform 104. In some embodiments, such input may take the form of an image of a current state of a product following a step of the multi-step manufacturing process. Based on the input, control module 106 may project a final quality metric of the product. Depending on the projected final quality metric of the product, control module 106 may determine one or more actions to take in subsequent manufacturing steps. For example, if the projected final quality metric falls outside of a range of acceptable values, control module 106 may take one or more actions to rectify the manufacturing process. In some embodiments, control module 106 may interface with station controllers in subsequent stations 108 to adjust their respective control and/or station parameters. These adjustments may aid in correcting the manufacturing process, such that the final quality metric may be within the range of acceptable quality metrics.

Figure 2:
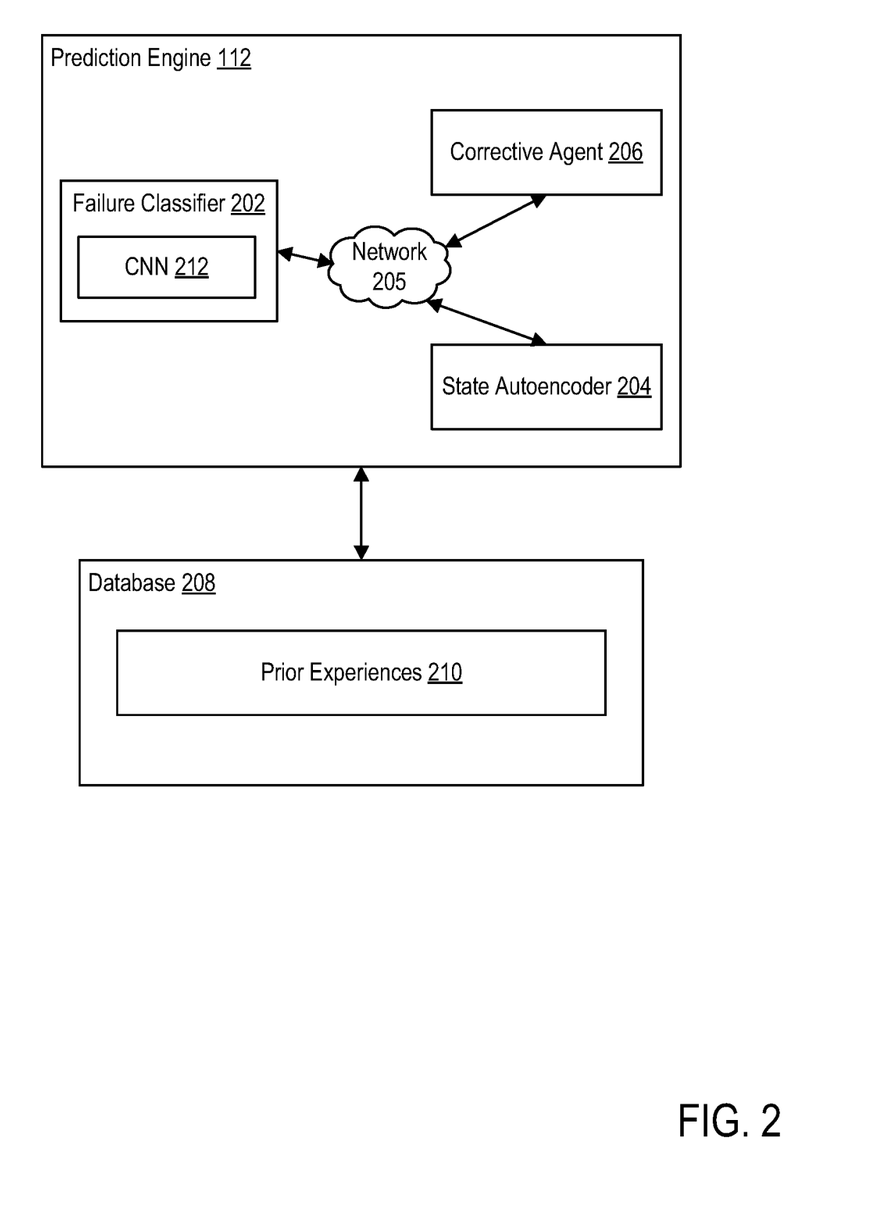
FIG. 2 is a block diagram illustrating prediction engine of manufacturing environment, according to example embodiments.

FIG. 2 is a block diagram illustrating prediction engine 112, according to exemplary embodiments. As illustrated, prediction engine 112 may include failure classifier 202, state autoencoder 204, and corrective agent 206. Each of failure classifier 202, state autoencoder 204, and corrective agent 206 may include one or more software modules. The one or more software modules may be collections of code or instructions stored on a media (e.g., memory of computing systems associated with control module 106) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions. Further, in some embodiments, each of failure classifier 202, state autoencoder 204, and corrective agent 206 may be configured to transmit one or more signals among the components. In such embodiments, such signals may not be limited to machine instructions executed by a computing device.

In some embodiments, failure classifier 202, state autoencoder 204, and corrective agent 206 may communicate via one or more local networks 205. Network 205 may be of any suitable type, including individual connections via the Internet, such as cellular or Wi-Fi networks. In some embodiments, network 205 may connect terminals, services, and mobile devices using direct connections, such as radio frequency identification (RFID), near-field communication (NFC), Bluetooth™, low-energy Bluetooth™ (BLE), Wi-Fi$^{SM}$, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Failure classifier 202 may be configured to determine whether a corrective action on a manufacturing technique is possible. For example, failure classifier 202 may receive, as input, input from monitoring platform 104. Based on the input, failure classifier 202 may determine whether an irrecoverable failure is present. Using a specific example in the field of 3D printing, when a part may become dislodged from a heat bed of the 3D printer or filament is ground down to the point that feeder gears are unable to grip the surface, layers will inherently be misprinted. This is typically an unrecoverable failure, as depositing any amount of plastic on the subsequent layers will not impact the final form of the print. In this manner, a failure is classified as a specimen whose current active layer is incapable of printing on. To correct for these circumstances, one approach is to stop printing the region in which failure was detected, such that the additional unfused plastic will not impact other specimen and cause the failure to cascade to a batch failure.

In some embodiments, failure classifier 202 may include a convolutional neural network (CNN) 212 trained to identify when an irrecoverable failure is present. In some embodiments, CNN 212 may include three convolutional/max pooling layers for feature learning, followed by a full-connected network with dropout, and soft-max activation performing binary classification. In some embodiments, CNN 212 may receive, as input from monitoring platform 104, an image of a product before a start of a manufacturing step. Based on the image, CNN 212 may be configured to generate a binary output (e.g., failed or not failed) indicating whether there is an irrecoverable failure present.

In some embodiments, CNN 212 may be trained on the following classes—failed or not failed. The training set may include various images of products that include features of failed products and features of not failed products. In some embodiments, the training set may include thousands of examples of each class. Using a specific example in the field of 3D printing, the training set may include an adequate number of instances of each classification, as a filed print with Y (e.g., 500) layers may have N examples representing a printable layer, and Y–N examples of failure, where N may represent the layer the print failed. In some embodiments, a given batch may include twelve specimens printed, totaling 6000 images per batch. A large set of training image may be collected with labelling that includes visually identifying the layer on which the print failed in an individual region of interest and splitting the data set accordingly.

State autoencoder 204 may be configured to generate a state encoding for a particular product, upon a determination by failure classifier 202 that the product has not failed. For example, state autoencoder 204 may be configured to generate a state for an agent to act from. In some embodiments, state autoencoder 204 may be trained user unsupervised methods in order to generate a state for an agent to act from.

Figure 3:
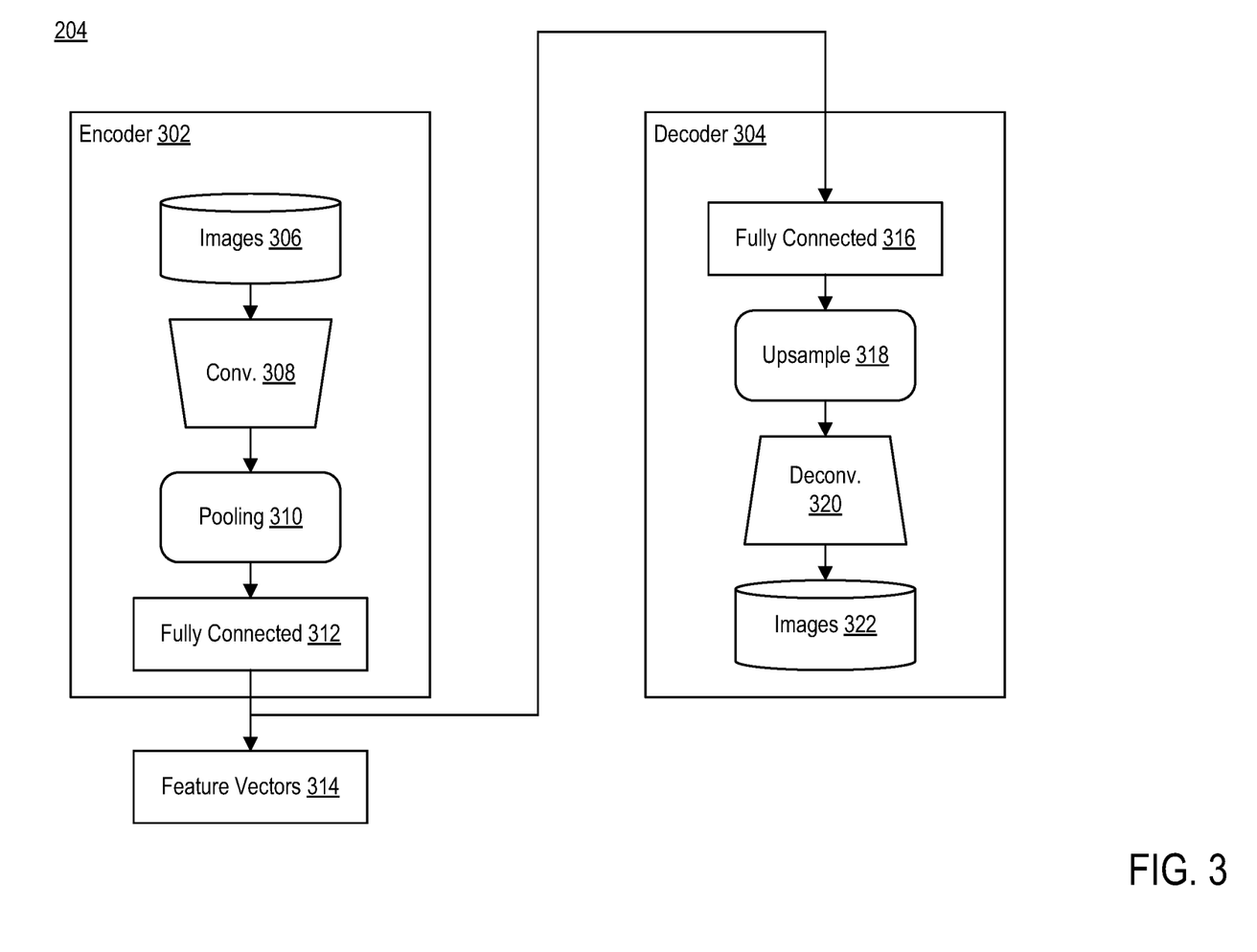
FIG. 3 is a block diagram illustrating architecture of state autoencoder of the prediction engine, according to example embodiments.

FIG. 3 is a block diagram illustrating architecture of state autoencoder 204, according to example embodiments. As shown, state autoencoder 204 may include an encoder portion 302 and a decoder portion 304. Encoder portion 302 and decoder portion 304 may be mirrored version of themselves, which allows the weights to be trained to reduce the information to an arbitrary dimension that is capable of representing the core components of an image.

As shown, encoder portion 302 may include images 306, one or more convolutional layers 308, a pooling layer 310, and one or more fully connected layers 312. In some embodiments, images 306 may be representative of an input image received from monitoring platform 104 of a target product or specimen. In some embodiments, one or more convolutional layers 308 may be representative of several convolutional layers, with each convolutional layer configured to identify certain features present in the input image. Following passage through one or more convolutional layers 308, the output from one or more convolutional layers 308 may be provided to a pooling layer 310. Pooling layer 310 may be configured to reduce the overall size of the image. The output of pooling layer 310 may be provided to one or more fully connected layers 312. In some embodiments, one or more fully connected layers 312 may be representative of several fully connected layers 312. One or more fully connected layers 312 may generate, as output, feature vector 314, which may be used as state definition for corrective agent 206. Feature vector 314 may be an encoded low dimensional representation of one or more high dimensional feature(s) of the target specimen (e.g., images of the specimen). The encoded feature vector 314 may be a latent variable of fixed dimension. Feature vector 314 dimension may be chosen as a part of the neural network design process to best represent the high dimensional features in the encoded latent space.

Decoder portion 304 may be configured to reconstruct the input image from the output generated by encoder portion 302. Decoder portion 304 may include one or more fully connected layers 316, one or more upsampling layers 318, one or more deconvolutional layers 320, and one or more images 322. One or more fully connected layers 316 may receive input from one or more fully connected layers 312. For example, one or more fully connected layers 316 may receive descaled image data as input, from encoder portion 302. Fully connected layers 316 may provide input to one or more upsampling layers 318. Upsampling layers 318 may be configured to upsample or increase the dimensions of the input provided by fully connected layers 316. Upsampling layers 318 may provide the upsampled images to one or more deconvolutional layers 320 to generate one or more images 322.

Referring back to FIG. 2, the feature vector generated by state autoencoder 204 may be provided as input to corrective agent 206. Corrective agent 206 may be configured to project a final quality metric for a product based on a current state of the product and identify one or more corrective actions to take, assuming the projected final quality metric is not within a range of acceptable values.

Figure 4:
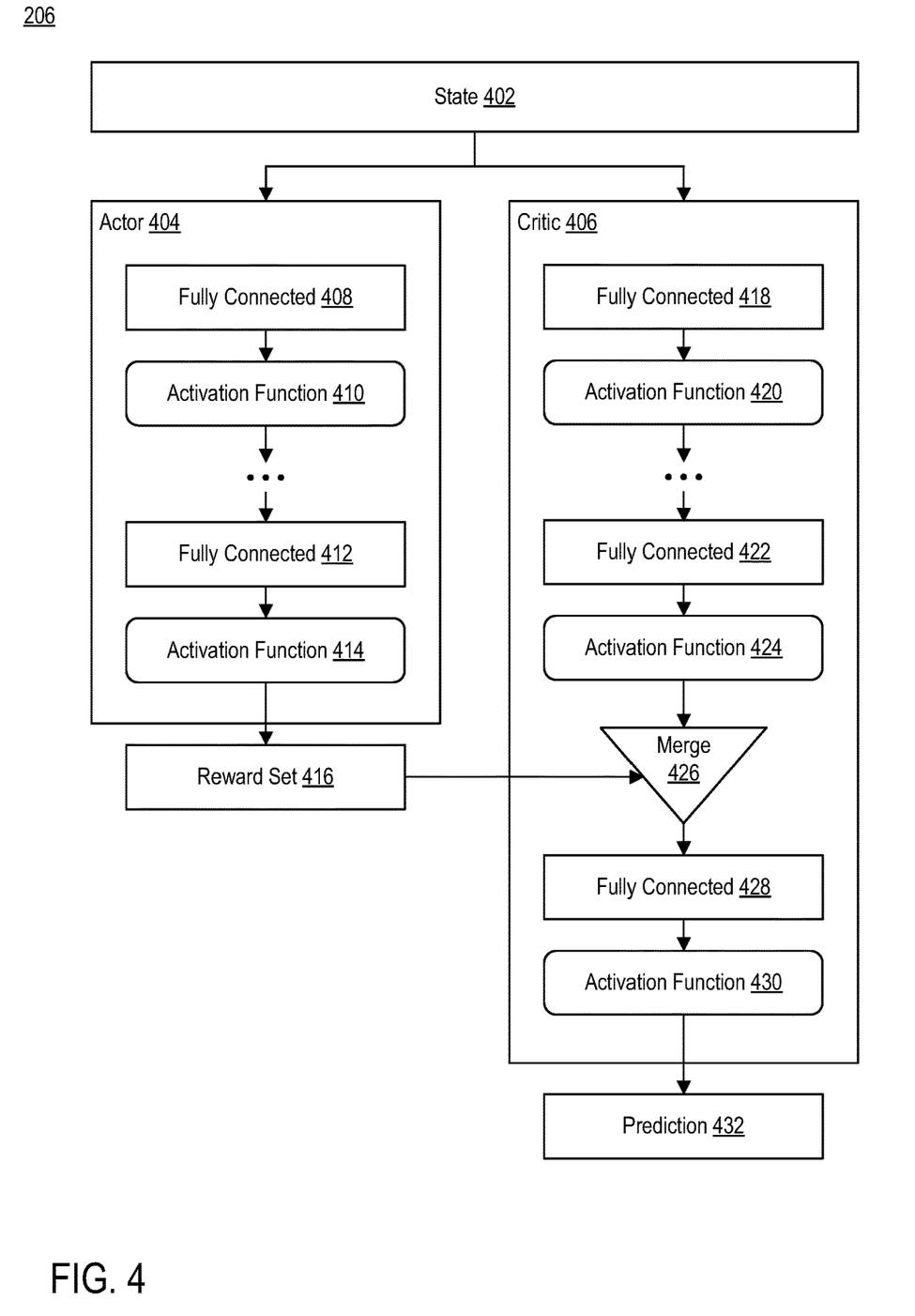
FIG. 4 is a block diagram illustrating architecture of an actor-critic paradigm for corrective agent of the prediction engine, according to example embodiments.

FIG. 4 is a block diagram illustrating architecture of an actor-critic paradigm for corrective agent 206, according to example embodiments. As shown, corrective agent 206 may include a current state 402, an actor network ("actor") 404, and a critic network ("critic") 406. Current state 402 may be representative of feature vector 314 generated by state autoencoder 204. For example, corrective agent 206 may receive feature vector 314 and, in parallel, use it as input to two separate networks: actor 404 and critic 406.

Actor 404 may be configured to generate predictions of corrective actions to be taken based on a given state definition. For example, based on feature vector 314, actor 404 may be configured to generate one or more corrective actions to be taken based on the final quality metric. In some embodiments, the set of possible permissible actions to be taken may be pre-set by a user. For example, in the case of 3D printing, the set of permissible actions to be taken may include changing a length of extruded plastic and changing a speed of the extruder head. These actions were selected because they are typically included in every print move of the 3D printing process and dictate the amount of plastic that is meant to be extruded per instruction, as well as the speed at which the print head moves. Both variables are related to the precision of the extrusion process.

As shown, actor 404 may include one or more fully connected layers 408, 412 and one or more activation functions 410, 414. In some embodiment, activation functions 410 and 414 may be hyperbolic tan (tanh) activation functions. As output, actor 404 may be configured to generate a set of actions (e.g., reward set 416) to be taken based on the current state of the product, as defined by feature vector 314.

Critic 406 may include architecture similar to actor 404. For example, critic 406 may include similar one or more fully connected layers 418, 422 and similar one or more activation functions 420, 424. The nature of identical inputs for actor 404 and critic 406 may suggest an appropriate transform would contain identical network architectures for both the actor 404 and critic 406 until concatenation. The architecture of both actor 404 and the critic 406 may be designed accordingly. Adopting similar architecture for both actor 404 and critic 406 may allow the design process to be simple, fast and easy to debug. In some embodiments, the size and shape of the subsequent network layers may be dependent on that concatenation. The output from one or more fully connected layers 418, 422 may be merged with the set of actions (e.g., reward set 416) generated by actor 404 (e.g., merge 426). Critic 406 may use the set of actions to make a prediction (e.g., prediction 432) of the quality over a trajectory of action using fully connected layers 428 and activation function 430.

Referring back to FIG. 2, prediction engine 112 may be in communication with database 208. Database 208 may store one or more prior experiences 210. Prior experiences 210 may be representative of recommended actions taken for a given state vector and a corresponding final quality metric as a result of those recommend actions. In this manner, prediction engine 112 may constantly adjust its parameters in order to learn which actions to take for a given state of a product that will result in a final quality metric that is within a range of acceptable final quality metrics.

Figure 5:
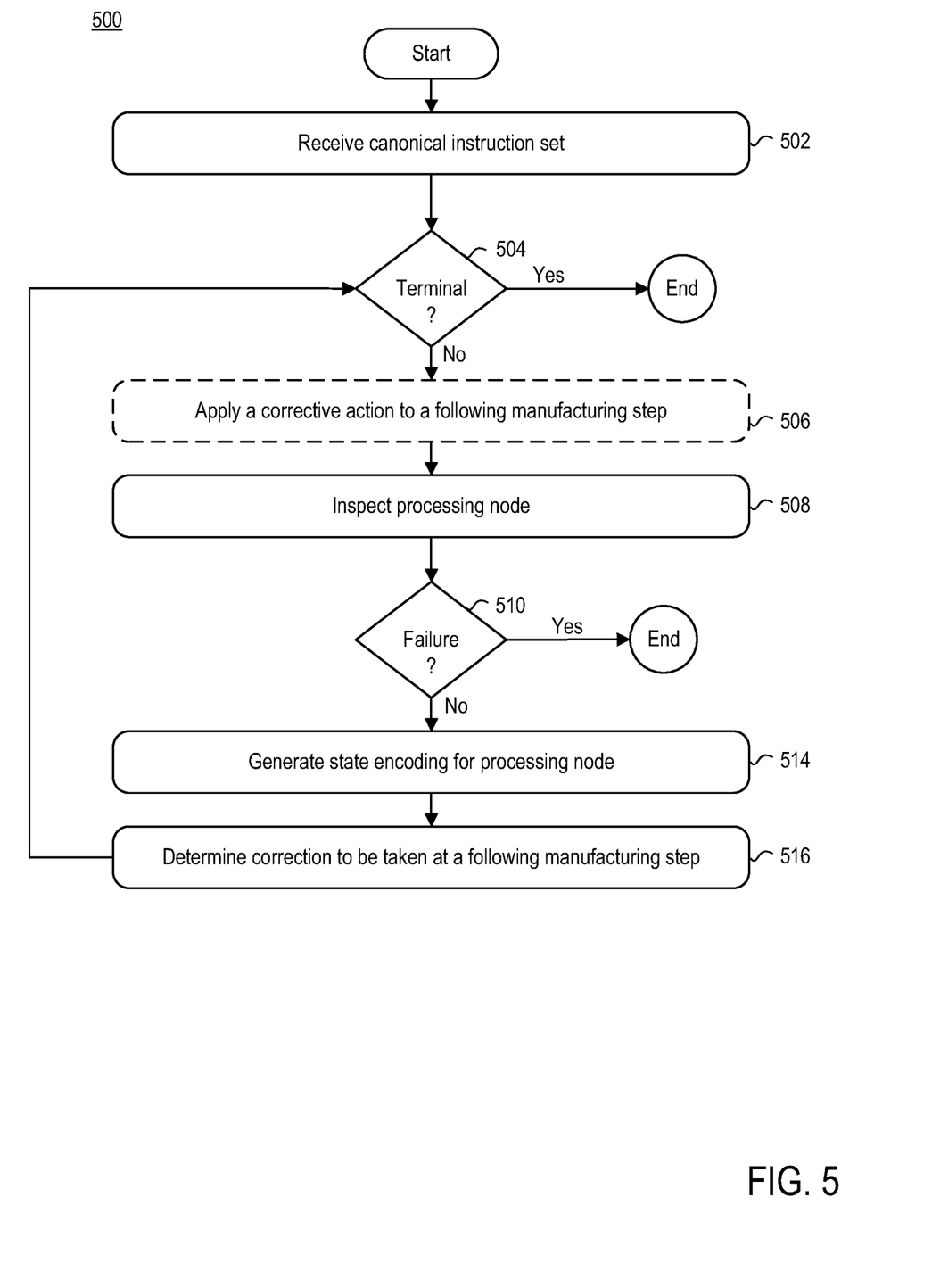
FIG. 5 is a flow diagram illustrating a method of performing a multi-step manufacturing process, according to example embodiments.

FIG. 5 is a flow diagram illustrating a method 500 of correcting a performing a multi-step manufacturing process, according to example embodiments. Method 500 may begin at step 502.

At step 502, a canonical instruction set may be provided to manufacturing system 102. Canonical instruction set may be representative of a set of instructions for a manufacturing process. In some embodiments, a canonical instruction set may be provided to each station 108. In such embodiments, each canonical instruction set may dictate the processing parameters for a specific manufacturing step corresponding to a respective station 108.

At step 504, control module 106 may determine whether manufacturing system 102 is in a terminal state. In other words, control module 106 may determine whether manufacturing system 102 has finished completing a target product. If control module 106 determines that manufacturing system 102 is in a terminal state (i.e., the product has been manufactured), then method 500 may end. If, however, control module 106 determines that manufacturing system 102 is not in a terminal state, method 500 may proceed to step 506.

At step 506, a corrective action may be applied to a given manufacturing step. For example, based on a prediction generated by corrective agent 206, control module 106 may instruct a given station 108 to adjust one or more processing parameters that correspond to the corrective action to be applied. In some embodiments, step 506 may be optional, such as in situations where the product is undergoing the first processing step or when corrective agent 206 determines that no corrected action is needed.

At step 508, prediction engine 112 may inspect the product at an end of a processing step. For example, prediction engine 112 may receive input (e.g., one or more images) of the product at the end of a particular processing step from monitoring platform 104. Using the input, failure classifier 202 may determine whether an irrecoverable failure is present. For example, failure classifier 202 may provide the image to CNN 212, which is trained to identify various features of the image to determine whether a irrecoverable failure is present.

At step 510, prediction engine 112 may determine whether a failure is present. If at step 510, prediction engine 112 determines that an irrecoverable failure is present, then the manufacturing process may terminate. If, however, at step 510, prediction engine 112 determines that an irrecoverable failure is not present, then method 500 may proceed to step 514.

At step 514, prediction engine 112 may generate a state encoding for the particular processing step. For example, state autoencoder 204 may be configured to generate a state encoding for the manufacturing step, upon a determination by failure classifier 202 that the product has not failed. State autoencoder 204 may generate the state encoding based on the received input (e.g., one or more image of the product) captured by monitoring platform 104.

At step 516, prediction engine 112 may determine a corrective action to be taken at the next station based on the input and the state encoding. For example, corrective agent 206 may be configured to project a final quality metric for a product based on a current state of the product and identify one or more corrective actions to take, assuming the projected final quality metric is not within a range of acceptable values. Prediction engine 112 may transmit the corrective action to a respective process controller 114 corresponding to a next processing step.

Following step 516, method 500 may revert to step 504, and control module 106 may determine whether manufacturing system 102 is in a terminal state. If control module 106 determines that manufacturing system 102 is in a terminal state (i.e., the product has been manufactured), then method 500 ends. If, however, control module 106 determines that manufacturing system 102 is not in a terminal state, method 500 may proceed to step 506.

At step 506, a corrective action may be applied to a given manufacturing step. For example, based on a prediction generated by corrective agent 206 at step 516, control module 106 may instruct a given station 108 to adjust one or more processing parameters that correspond to the corrective action to be applied.

The following processes may repeat until control module 106 determines that manufacturing system 102 is in a terminal state.

Figure 6A:
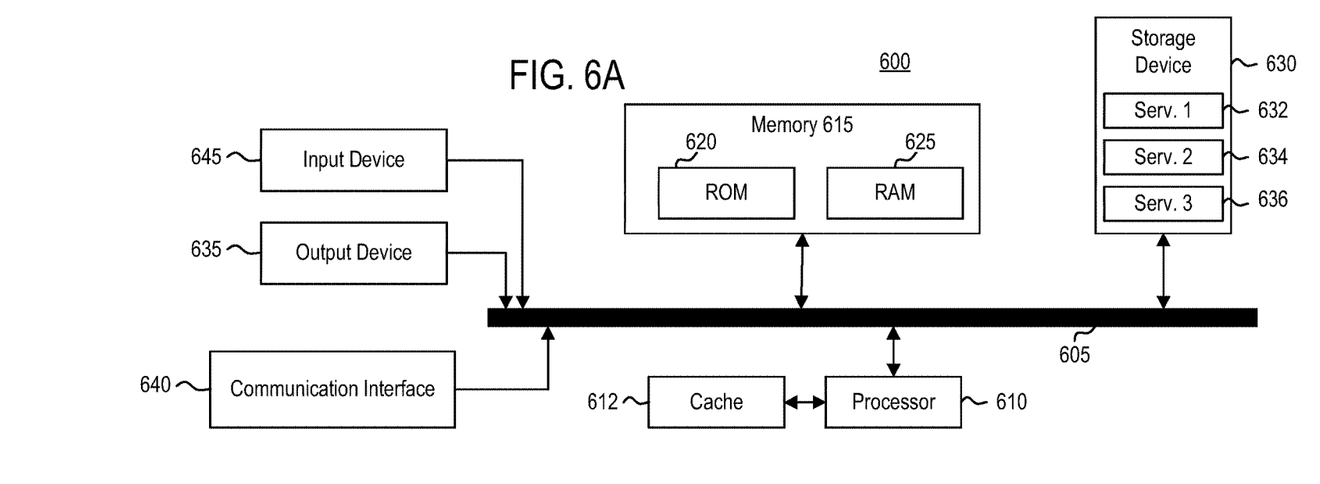
FIG. 6A illustrates a system bus computing system architecture, according to example embodiments.

FIG. 6A illustrates a system bus computing system architecture 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 3 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing device 600, an input device 645 which can be any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with computing device 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, display 635, and so forth, to carry out the function.

Figure 6B:
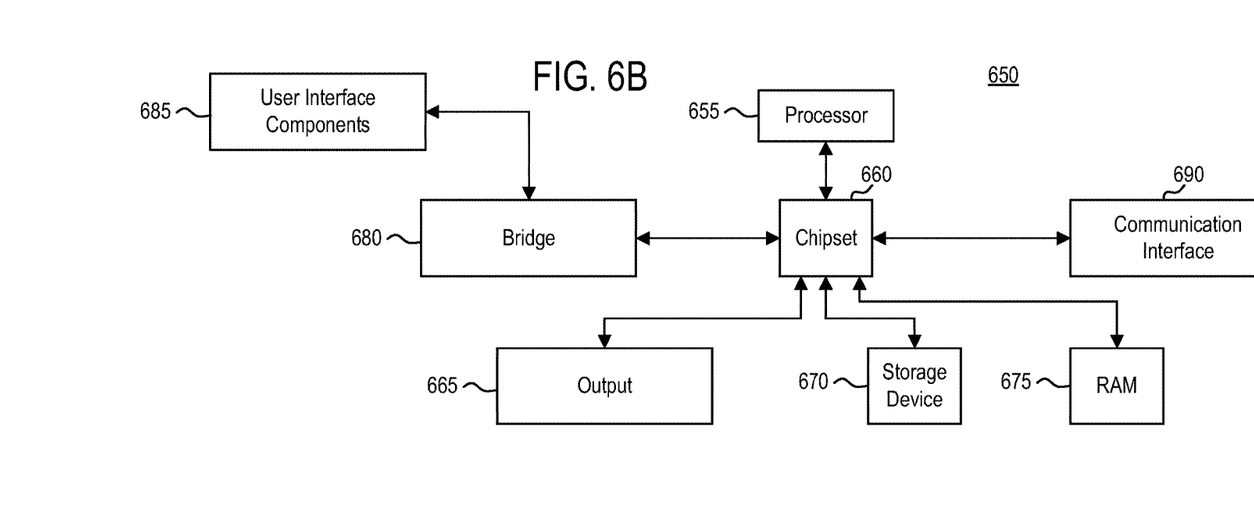
FIG. 6B illustrates a computer system having a chipset architecture, according to example embodiments.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A manufacturing system, comprising:
   one or more stations, each station configured to perform at least one step in a multi-step manufacturing process for a product;
   a monitoring platform configured to monitor progression of the product throughout the multi-step manufacturing process; and
   a computing system configured to adjust processing parameters of each step of the multi-step manufacturing process to achieve a desired final quality metric for the product, the computing system configured to perform operations, comprising:
      receiving, by the computing system from the monitoring platform, an input associated with the product at a step of the multi-step manufacturing process, wherein the input comprises an image of the product at the step of the multi-step manufacturing process;
      generating, by a state autoencoder of the computing system, a state encoding for the product based on the input;
      determining, by a deep learning model of the computing system, based on the state encoding and the image of the product that a final quality metric for the product is not within a range of acceptable values; and
      based on the determining, adjusting by the computing system, a control logic for at least a following station, wherein the adjusting comprises generating, by the deep learning model, a corrective action to be performed by the following station.

2. The manufacturing system of claim 1, wherein the final quality metric cannot be measured until processing of the product is complete.

3. The manufacturing system of claim 1, wherein adjusting, by the computing system, the control logic for at least the following station, comprises:
   identifying the corrective action to be performed by the following station; and
   projecting the final quality metric based on the corrective action and the state encoding.

4. The manufacturing system of claim 1, wherein the operations further comprise:
   determining, by the computing system, whether an irrecoverable failure is present based on the input.

5. The manufacturing system of claim 4, wherein the input comprises an image and wherein the computing system determines that the irrecoverable failure is present using a convolutional neural network.

6. The manufacturing system of claim 1, wherein adjusting by the computing system, the control logic for at least the following station, comprises:
   adjusting a further control logic for a further following station.

7. The manufacturing system of claim 1, wherein each of the one or more stations correspond to a layer deposition in a 3D printing process.

8. A multi-step manufacturing method, comprising:
   receiving, by a computing system from a monitoring platform of a manufacturing system, an image of a product at a station of one or more stations, each station configured to perform a step of a multi-step manufacturing process;
   generating, by a state autoencoder of the computing system, a state encoding for the product based on the image of the product;
   determining, by a deep learning model of the computing system, based on the state encoding and the image of the product that a final quality metric of the product is not within a range of acceptable values; and
   based on the determining, adjusting by the computing system, a control logic for at least a following station, wherein the adjusting comprises generating, by the deep learning model, a corrective action to be performed by the following station.

9. The multi-step manufacturing method of claim 8, wherein the final quality metric cannot be measured until processing of the product is complete.

10. The multi-step manufacturing method of claim 8, wherein adjusting, by the computing system, the control logic for at least the following station, comprises:
   identifying the corrective action to be performed by the following station; and
   projecting the final quality metric based on the corrective action and the state encoding.

11. The multi-step manufacturing method of claim 8, further comprising:
   determining, by the computing system, whether an irrecoverable failure is present based on the image.

12. The multi-step manufacturing method of claim 11, wherein the computing system determines that an irrecoverable failure is present using a convolutional neural network.

13. The multi-step manufacturing method of claim 8, wherein adjusting by the computing system, the control logic for at least the following station, comprises:
   adjusting a further control logic for a further following station.

14. The multi-step manufacturing method of claim 8, wherein each of the one or more stations correspond to a layer deposition in a 3D printing process.

15. A three-dimensional (3D) printing system, comprising:
   a processing station configured to deposit a plurality of layers to form a product;
   a monitoring platform configured to monitor progression of the product throughout a deposition process; and
   a computing system configured to adjust processing parameters for each layer of the plurality of layers to achieve a desired final quality metric for the product, the computing system configured to perform operations, comprising:
      receiving, by the computing system from the monitoring platform, an image of the product after a layer has been deposited;
      generating, by a state autoencoder of the computing system, a state encoding for the product based on the image of the product;
      determining, by a deep learning model of the computing system, based on the state encoding and the image of the product that a final quality metric for the product is not within a range of acceptable values; and
      based on the determining, adjusting, by the computing system, a control logic for depositing at least a following layer of the plurality of layers, wherein the adjusting comprises generating, by the deep learning model, a corrective action to be performed during deposition of the following layer.

16. The system of claim 15, wherein the final quality metric cannot be measured until processing of the product is complete.

17. The system of claim 15, wherein adjusting, by the computing system, the control logic for depositing at least the following layer, comprises:
   identifying the corrective action to be performed during deposition of the following layer; and
   projecting the final quality metric based on the corrective action and the state encoding.

18. The system of claim 15, further comprising:
   determining, by the computing system, whether an irrecoverable failure is present based on the image.

19. The system of claim 18, wherein the computing system determines that the irrecoverable failure is present using a convolutional neural network.

20. The system of claim 15, wherein adjusting by the computing system, the control logic for depositing at least the following layer, comprises:
   adjusting a further control logic for a further following layer.

* * * * *